(12) United States Patent
Conrique

(10) Patent No.: US 7,530,131 B1
(45) Date of Patent: May 12, 2009

(54) MULTI-FUNCTIONAL UTILITY TOOL

(76) Inventor: David L. Conrique, 19523 Natalie Way, Redding, CA (US) 96003

( * ) Notice: Subject to any disclaimer, the term of this patent is extended or adjusted under 35 U.S.C. 154(b) by 0 days.

(21) Appl. No.: 11/431,641

(22) Filed: May 9, 2006

(51) Int. Cl.
B26B 11/00 (2006.01)
(52) U.S. Cl. .................... 7/158; 7/163; 7/164
(58) Field of Classification Search ............ 7/158, 7/163, 164
See application file for complete search history.

(56) References Cited

U.S. PATENT DOCUMENTS

| 4,884,307 | A | * | 12/1989 | Flood | 7/156 |
| 4,890,387 | A | * | 1/1990 | Canino | 7/118 |
| 5,107,560 | A | * | 4/1992 | Hulsey | 7/163 |
| 5,623,737 | A | * | 4/1997 | Moyer et al. | 7/158 |
| 5,906,049 | A | * | 5/1999 | Butts | 30/125 |
| 6,148,522 | A | * | 11/2000 | Dobandi | 30/162 |
| 6,467,173 | B1 | * | 10/2002 | Umstead et al. | 30/144 |

* cited by examiner

Primary Examiner—Joseph J Hail, III
Assistant Examiner—Shantese McDonald

(57) ABSTRACT

A multi-functional utility tool is disclosed. The multi-functional utility tool includes a tool handle. At least one of a utility blade and a saw is extendable from the tool handle. A sanding surface is provided on the tool handle for smoothing a workpiece.

12 Claims, 4 Drawing Sheets

MULTI-FUNCTIONAL UTILITY TOOL

FIELD OF THE INVENTION

The present invention relates to utility tools. More particularly, the present invention relates to a multi-functional utility tool having various workpiece cutting and shaping functions.

BACKGROUND OF THE INVENTION

Various types of utility knives are known in the art for cutting workpieces. Typically, a utility knife includes a handle having a blade slot and a box cutting or utility blade extending from the slot. A thumb slide engages the blade through a slot provided in the handle to facilitate extending the blade from the handle through the slot. However, the utility blade is typically suitable only for cutting paper, cardboard and other soft materials. Therefore, a multi-functional utility knife is needed which is capable of cutting or shaping a variety of workpieces.

SUMMARY OF THE INVENTION

The present invention is generally directed to a multi-functional utility tool. The multi-functional utility tool includes a tool handle. At least one of a utility blade and a saw is extendable from the tool handle. A sanding surface is provided on the tool handle for smoothing a workpiece.

BRIEF DESCRIPTION OF THE DRAWINGS

The invention will now be described, by way of example, with reference to the accompanying drawings, in which.

DETAILED DESCRIPTION OF THE INVENTION

Figure 1:
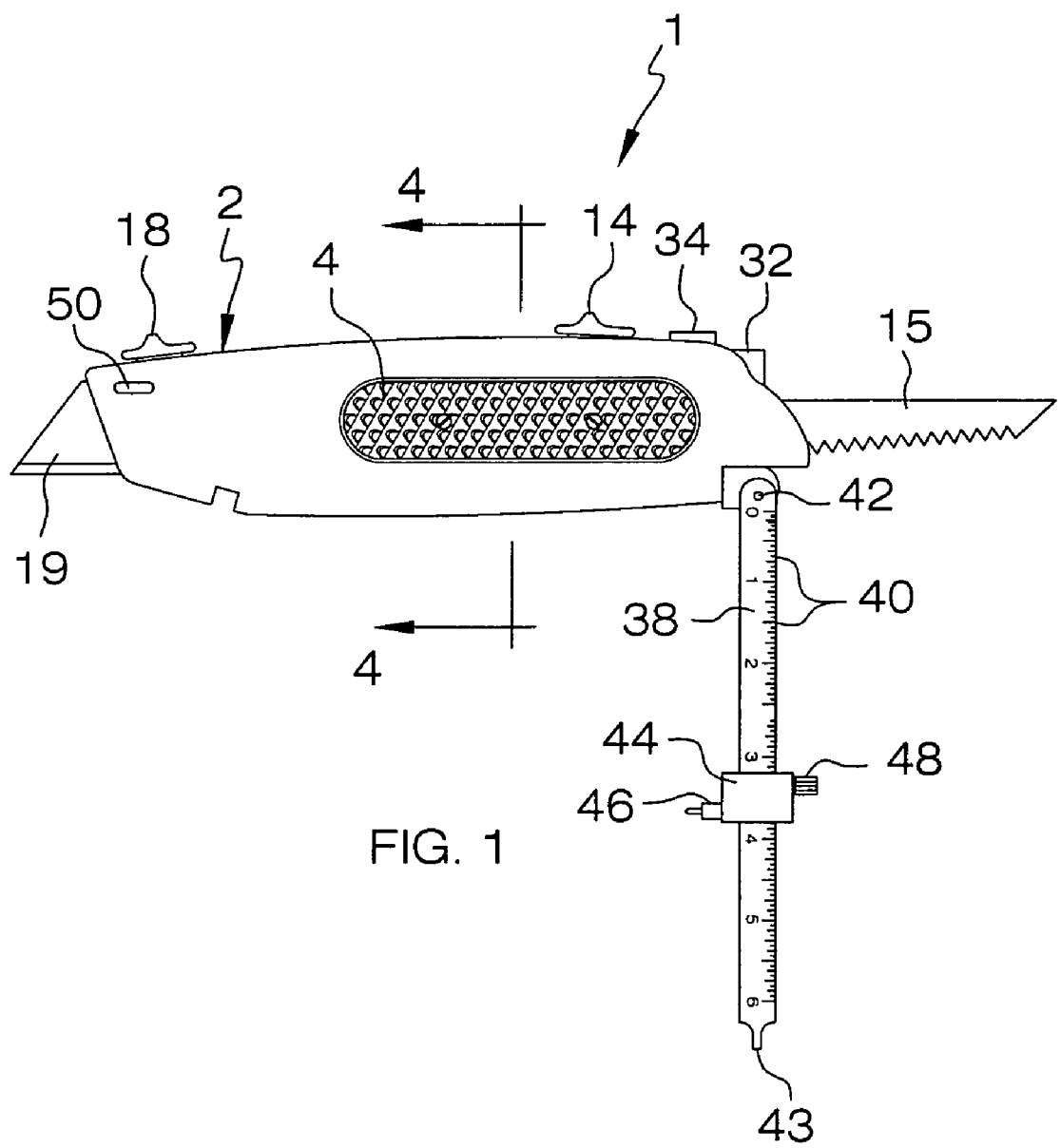
FIG. 1 is a side view of an illustrative embodiment of the multi-functional utility knife according to the present invention.
Figure 2:
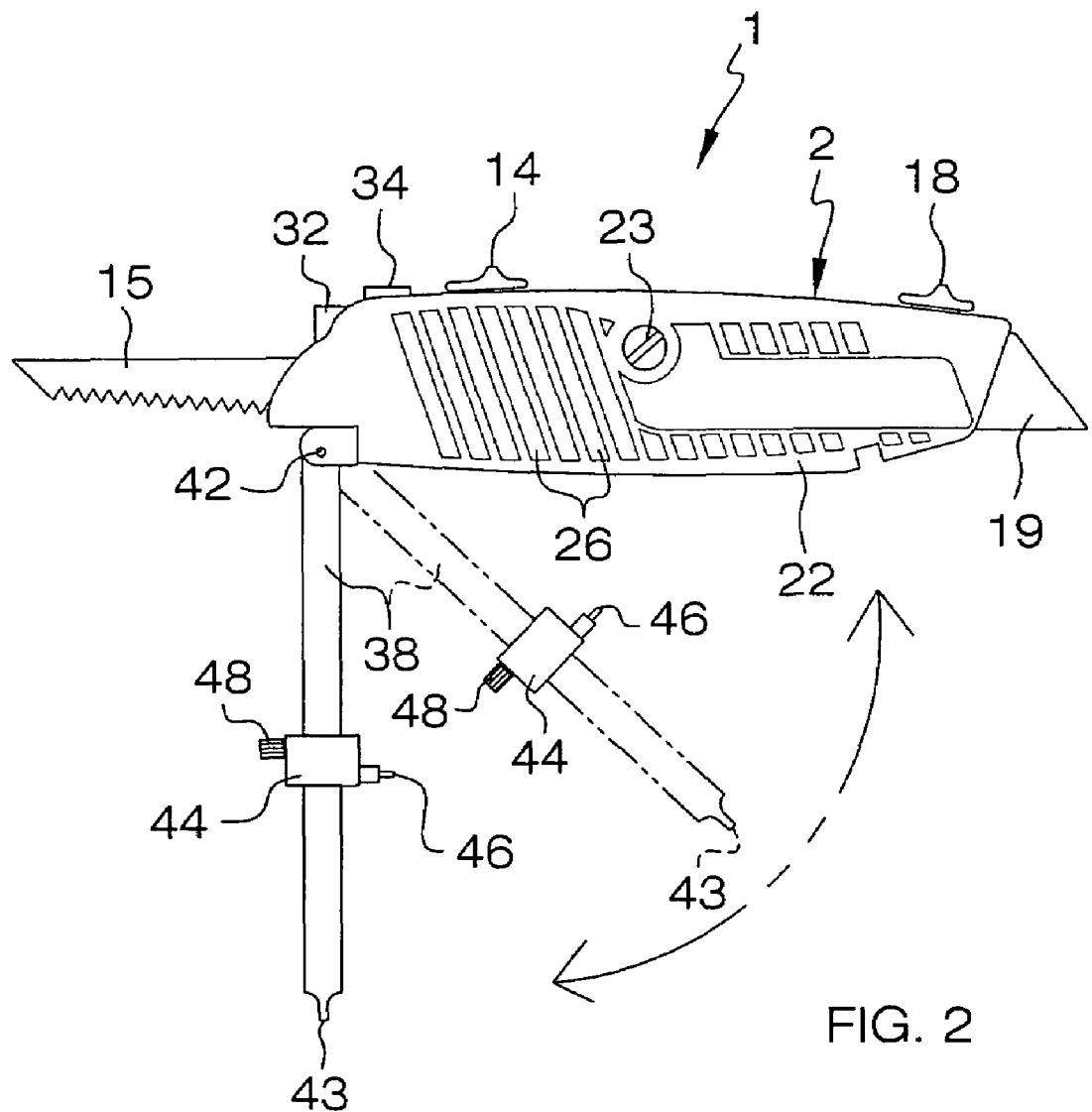
FIG. 2 is an opposite side view of the multi-functional utility knife.
Figure 3:
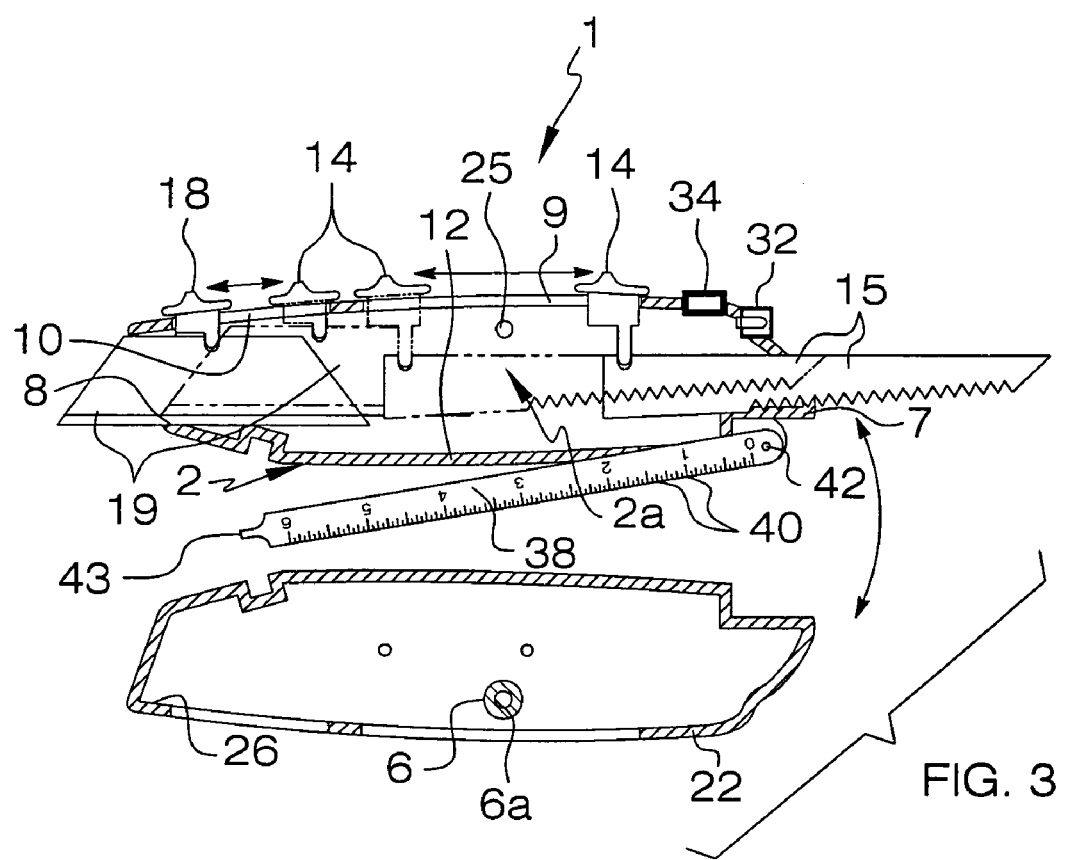
FIG. 3 is an exploded, interior view of the multi-functional utility knife.
Figure 4:
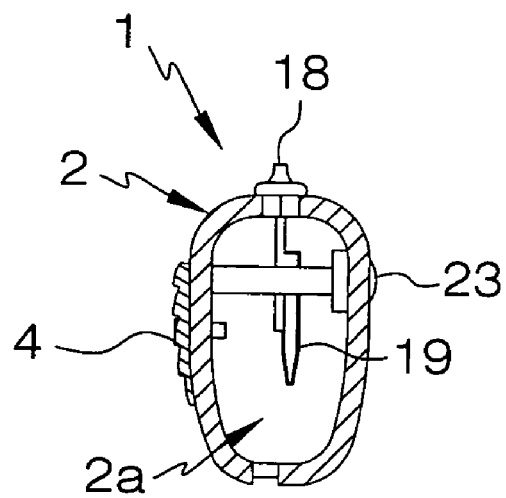
FIG. 4 is a cross-sectional view, taken along section lines 4-4 in FIG. 1, of the multi-functional utility knife.

Referring to the drawings, an illustrative embodiment of the multi-functional utility knife according to the present invention is generally indicated by reference numeral 1. The multi-functional utility knife 1 includes a tool handle 2 having a handle interior 2a, as shown in FIGS. 3 and 4. The tool handle 2 typically includes a handle housing 3 and a housing plate 22 which is secured to the handle housing 3. Accordingly, as shown in FIG. 3, a boss 6, through which extends a screw opening 6a, is typically provided on the housing plate 22. A screw opening 25 extends through the tool handle 2 and registers with the screw opening 6a of the housing plate 22. A screw 23 (FIG. 2) is extended through the screw opening 25 of the handle housing 3 and threaded into the screw opening 6a provided in the boss 6 of the housing plate 22. An opening (not shown) may be provided in the handle housing 3 and an opening (not shown) provided in the housing plate 22 to register with each other and facilitate hanging the tool handle 2 on a support (not shown), for example. As shown in FIG. 1, a sanding surface 4, such as sandpaper or a roughened metal surface, for example, may be provided on the exterior surface of the handle housing 3 for purposes which will be hereinafter described. As shown in FIG. 2, ridges 26 may be provided in the exterior surface of the housing plate 22 to facilitate gripping of the tool handle 2, as will be hereinafter described.

As shown in FIG. 3, a saw opening 7 is provided in one end, and a blade opening 8 is provided in the opposite end, of the tool handle 2. A thumb tab slot 9 is provided in the upper surface of the tool handle 2 and extends rearwardly of the saw opening 7. A thumb tab slot 10 is also provided in the upper surface of the tool handle 2 and extends rearwardly of the blade opening 8.

A saw 15 is provided in the handle interior 2a and is slidably extendable from the saw opening 7. A saw slide thumb tab 14 is slidably mounted in the thumb tab slot 9 and engages the saw 15. Accordingly, the saw 15 can be selectively extended from the saw opening 7 or retracted in the saw opening 7 by sliding the saw slide thumb tab 14 in the appropriate direction in the thumb tab slot 9. The saw slide thumb tab 14 is typically fitted with a slide lock (not shown), which may be conventional, to lock the saw 15 in an extended or retracted configuration with respect to the tool handle 2.

A utility blade 19 is provided in the handle interior 2a and is slidably extendable from the blade opening 8. A blade slide thumb tab 18 is slidably mounted in the thumb tab slot 10 and engages the utility blade 19. Accordingly, the utility blade 19 can be selectively extended from the blade opening 8 or retracted in the blade opening 8 by sliding the blade slide thumb tab 18 in the appropriate direction in the thumb tab slot 10. The blade slide thumb tab 18 is typically fitted with a slide lock (not shown), which may be conventional, to lock the utility blade 19 in an extended or retracted configuration with respect to the tool handle 2.

A light 32 may be provided on the utility knife 1. For example, the light 32 may be provided adjacent to the saw opening 7 of the tool handle 2, as shown in FIG. 3. A light button 34 is provided on the utility knife 2, typically adjacent to the light 32, to facilitate turning the light 32 on and off. A battery (not shown) is provided in the handle interior 2a of the tool handle 2 and is connected to the light 32 and the light button 34 to power the light 32.

A measuring bar 38 may be provided on the utility knife 1. For example, the measuring bar 38 may be pivotally attached to the tool handle 2 at a pivot pin 42. The measuring bar 38 may be pivotal between an extended position with respect to the tool handle 2, as shown in FIGS. 1 and 2, to a retracted position in which the measuring bar 38 is stored or accommodated in a bar slot 12 (FIG. 3) in the tool handle 2 or between the tool handle 2 and the housing plate 22. Multiple length graduations 40, which may mark centimeters, millimeters and/or inches, for example, may be provided on the measuring bar 38. A flathead screwdriver 43 may be provided in the extending end of the measuring bar 38. A length marker 44 may be slidably mounted on the measuring bar 38 to facilitate marking various lengths along the measuring bar 38. A scribe wheel 46 and/or a thumb screw 48 may be provided on the length marker 44. As shown in FIG. 1, a blade change button 50 may be provided on the tool handle 2 to facilitate changing utility blades 19 in the utility knife 1, typically in conventional fashion.

Figure 5:
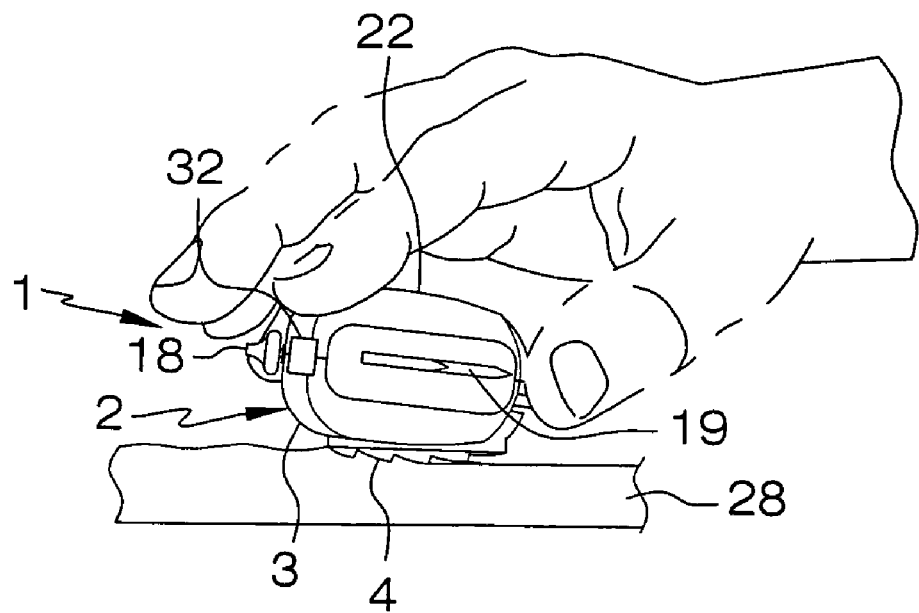
FIG. 5 illustrates use of the multi-functional utility knife in the sanding of a workpiece in typical use of the utility knife.

In typical use of the multi-functional utility knife 1, the utility blade 19 is extended from the blade handle 2 and locked into position to cut soft materials such as paper and cardboard, for example, while the saw 15 remains retracted and locked in the blade handle 2. On the other hand, the saw 15 is extended from the blade handle 2 and locked into position to cut hard materials such as wood or plastic, for example, while the utility blade 19 remains retracted and locked in the blade handle 2. As shown in FIG. 5, the sanding surface 5 can be pressed against a workpiece 28, such as drywall or wood, for example, to impart a smooth surface to the workpiece 28. When not in use, the utility knife 1 can be attached to a wire (not shown) or the like hanging on a wall or other support (not shown), for example, by inserting the wire through the registering openings 5, 24 provided in the handle housing 3 and housing plate 22, respectively. It will be appreciated by those skilled in the art that extra utility blades 19 may be stored in the handle interior 2a and accessed, as needed, by unthreading the screw 23 and detaching the handle housing 3 from the housing plate 22. The light 32 can be actuated by the light button 34 to illuminate an area using the light 32, as deemed necessary. The measuring bar 38 can be pivoted from the bar slot 12 to the extended position shown in FIGS. 1 and 2 to facilitate measuring distances typically using the length marker 44. The blade change button 50 can be used to change utility blades 19 in the tool handle 2, as deemed necessary.

While the preferred embodiments of the invention have been described above, it will be recognized and understood that various modifications can be made in the invention and the appended claims are intended to cover all such modifications which may fall within the spirit and scope of the invention.

What is claimed is:

1. A utility tool comprising:
   an elongated tool handle having first and second ends;
   a utility blade extendable from said first end of said tool handle;
   a measuring bar pivotally attached to the second end of the tool handle via a pivot pin, wherein the measuring bar can move between an extended position and a retracted position, wherein in the retracted position the measuring bar is stored in a bar slot disposed in the tool handle;
   a length marker slidably mounted on the measuring bar to facilitate marking a length along the measuring bar;
   a saw slidingly extendable in a longitudinal direction from said second end of said tool handle; and
   a sanding surface provided on said tool handle.

2. The utility tool of claim 1 wherein said tool handle comprises a handle housing and a housing plate carried by said handle housing.

3. The utility tool of claim 1 further comprising a blade slide thumb tab carried by said tool handle and engaging said utility blade.

4. The utility tool of claim 3 further comprising a thumb tab slot provided in said tool handle and wherein said blade slide thumb tab slidably engages said thumb tab slot.

5. The utility tool of claim 3 further comprising a saw slide thumb tab carried by said tool handle and engaging said saw.

6. The utility tool of claim 5 further comprising a thumb tab slot provided in said tool handle and wherein said saw slide thumb tab slidably engages said thumb tab slot.

7. The utility tool of claim 1 further comprising an opening extending though said tool handle.

8. The utility tool of claim 1 further comprising a plurality of ridges provided in said tool handle.

9. A utility tool comprising:
   an elongated tool handle having first and second ends;
   a utility blade extendable from said first end of said tool handle;
   a measuring bar pivotally attached to the second end of the tool handle via a pivot pin, wherein the measuring bar can move between an extended position and a retracted position, wherein in the retracted position the measuring bar is stored in a bar slot disposed in the tool handle;
   a length marker slidably mounted on the measuring bar to facilitate marking a length along the measuring bar;
   a screwdriver disposed on an extending end of the measuring bar;
   a saw slidingly extendable in a longitudinal direction from said second end of said tool handle; and
   a sanding surface provided on said tool handle.

10. The utility tool of claim 9 further comprising a thumb tab slot provided in said tool handle and a blade slide thumb tab slidably engaging said thumb tab slot and engaging said utility blade.

11. The utility tool of claim 10 further comprising a second thumb tab slot provided in said tool handle and a saw slide thumb tab slidably engaging said second thumb tab slot and engaging said saw.

12. The utility tool of claim 11 further comprising a plurality of ridges provided in said tool handle.

* * * * *